(12) United States Patent
Ewbank

(10) Patent No.: X3707
(45) Date of Patent: May 30, 1823

(54) LEAD, TINNED SHEET

(76) Inventor: Thomas Ewbank

Thomas Ewbank
Letters Patent

The Schedule referred to in these Letters Patent and making part of the same, containing a description in the words of the said Thomas Ewbank himself of his improvement in the manufacture of tinned Sheet Lead.

---

Having procured a wide and shallow iron pot, whose width is sufficient to admit the width of the lead to be tinned: I open the sheet of Lead, or whatever size it is, and make the surface bright, by scraping or carding all dirt or oxide from it: after which I smear it over with tallow or sprinkle powdered rosin over it; when it is prepared for tinning.

If both sides of the lead are to be tinned; then both are prepared in the same way; but if one side only of the lead is to be tinned; then that side which is <u>not</u> to be tinned; is brushed over with lamp black and size, mixed together, to the consistence of cream or paint, which when dry prevents the tin from adhering to that side.

Block or grain tin is then melted in the iron pot, till there is sufficient in depth to cover perfectly the thickness of the lead to be tinned, taking care to skim from the surface, all dross, oxide, or dirt whatever: I then slide one end of the sheet of lead into the melted tin, at one end of the pot and gradually draw it out at the other end, till the whole sheet has been immersed in the tin, and <u>become</u> tinned.

The temperature of the melted tin, is the most essential point to be attended to, because there are not very many degrees between the melting point of lead, and that of tin: the safest way is, to apply as much fire to the pot as will but just keep the tin in a liquid state, or two or three degrees higher; and no more; otherwise, it would be in danger of melting or dissolving the lead while passing through it; the cooler the tin is, the slower must the lead pass through it, and vice versa. Or, I take the lead after it is cleaned and ready for tinning, and roll it up like a scroll, but taking care to keep the folds from touching each other, and then dip it perpendicularly into a pot, containing liquid tin, sufficient in depth to cover the lead; and after it has remained a few seconds, according to the heat of the tin, I lift it up, when the superfluous tin runs off, much in the same way, as those sheets of iron are tinned from which is made tin ware, commonly so called.

Witnesses                                                  Thomas Ewbank.

Isaac Adriance }
E. M. Bridges }

Entd
[illegible]

451 wds

2—328 a.

DRAFTSMAN'S DIVISION.

*All communications should be addressed to*
"The Commissioner of Patents.
Washington, D. C."

*DEPARTMENT OF THE INTERIOR,*

United States Patent Office,

*Washington, D. C., ............ , 189...*

*SIR:*

*The printed* Copies *of Patent No.* J Eubank
are *exhausted.* May 30 1823

*As soon as printed a copy will be mailed you to complete your order.*

*By direction of the Commissioner:*

*Very respectfully,*

*Chief Clerk.*

3143b6-97-5m